March 23, 1926. 1,577,722
J. W. HORTON
GENERATION AND CONTROL OF ELECTRIC WAVES
Filed April 24, 1922
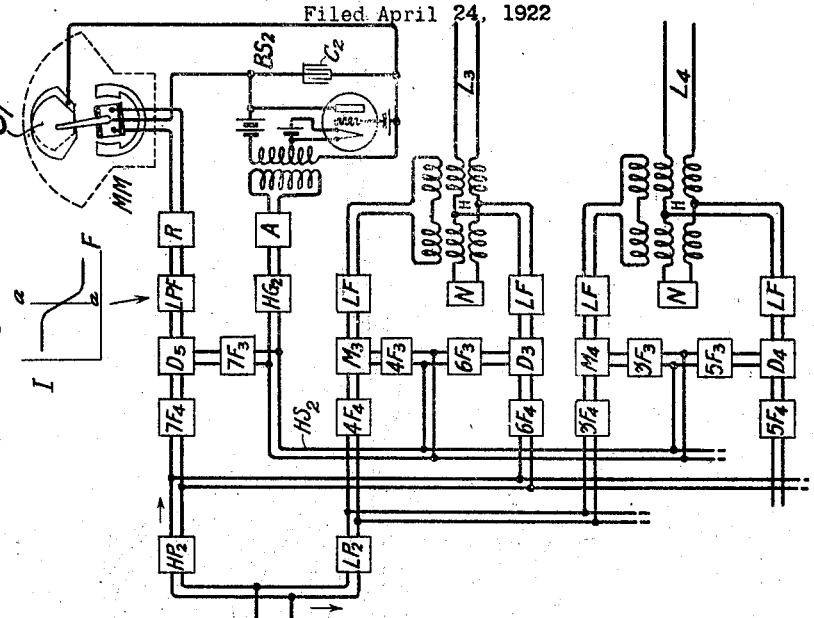
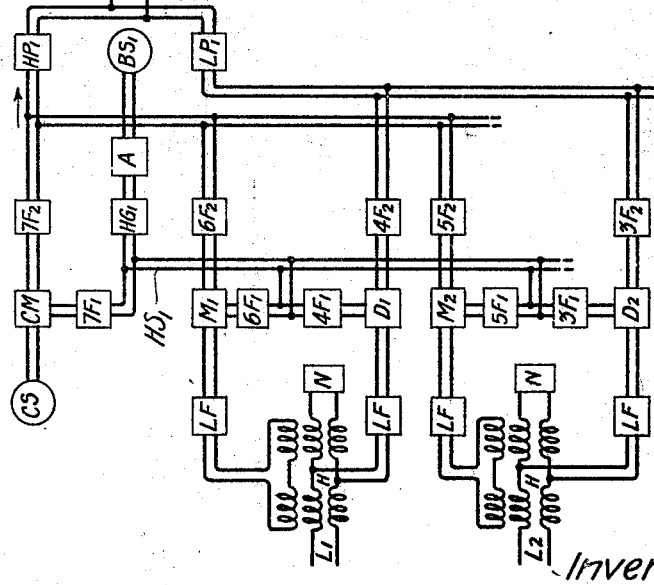
Inventor:
Joseph W. Horton.
by E. V. Griggs
Att'y Patented Mar. 23, 1926.

1,577,722

UNITED STATES PATENT OFFICE.

JOSEPH W. HORTON, OF EAST ORANGE, NEW JERSEY, ASSIGNOR TO WESTERN ELECTRIC COMPANY, INCORPORATED, OF NEW YORK, N. Y., A CORPORATION OF NEW YORK.

GENERATION AND CONTROL OF ELECTRIC WAVES.

Application filed April 24, 1922. Serial No. 556,179.

*To all whom it may concern:*

Be it known that I, JOSEPH W. HORTON, a citizen of the United States, residing at East Orange, in the county of Essex and State of New Jersey, have invented certain new and useful Improvements in Generation and Control of Electric Waves, of which the following is a full, clear, concise, and exact description.

The present invention relates to the generation and control of electric waves and more particularly to the maintenance of wave sources in definite frequency relation with one another.

The invention is particularly applicable to control systems or signaling systems in which wave sources are located at separate stations and are to be kept in definite frequency relation with one another under control of currents or waves transmitted between the stations, but the invention is capable also of general application as a means and method of coordinating separate wave sources.

In certain control or signaling systems, a wave of a definite frequency derived from a source at one station is utilized for the transmission of signals or the like to another station, where the received signal-controlled wave is made to interact with a wave of definite frequency derived from a source at the receiving station, and the difference in frequency, if any, existing between these two derived waves is utilized to effect an adjustment or alteration in the source at the receiving station.

For this purpose it may often be desirable to transmit between the stations a wave of a high frequency in which case small numerical differences in frequency would amount to only a very small percentage difference at the high frequency, and any correcting system sensitive only to percentage frequency changes at the high frequency would not be able to correct the local source to a very high degree of exactness. According to the invention, however, the correction is carried out under control of a low frequency wave or waves, and by making the actual discrepancy between the high frequency waves appear as a numerical error in the low frequency waves or circuits, correction to within a very small percentage error between the high frequencies is accomplished.

An object of the invention is to provide for maintaining two high frequency wave sources in synchronism and in substantially the same numerical frequency correspondence that can be maintained between two low frequency circuits.

A further object is to adapt such frequency control to high frequency transmission systems.

It is a further object of the invention to provide such a frequency control in a carrier transmission system in which no unmodulated carrier component is transmitted and to adapt the frequency control system to the particular apparatus of such a carrier system.

A better understanding of the exact nature and objects of the invention will be afforded by the following more detailed description together with the drawing; of which Fig. 1 represents schematically a carrier current transmission system to which the invention is particularly applicable, and Fig. 2 shows a curve indicating the manner of using the transmission characteristics of the low pass filter LPF.

It is well known that two independently controlled oscillators, particularly of the vacuum tube amplifier type, by careful adjustment can be made to generate waves of the same frequency to within a small percentage variation. Assuming that the frequency variation of each generator may be kept as low as one tenth of one percent, however, the variation becomes considerable at the frequencies used, for example, in radio systems or in carrier current transmission over wires. Thus, at 30,000 cycles an error of this magnitude in either generator would amount to 30 cycles per second or if the waves from two such generators are used conjointly the total variation may amount to 60 cycles per second. At a generator frequency of only 200 cycles, on the contrary, a deviation of one tenth percent is only one fifth of a cycle per second or the combined deviations of two such generators is only of the order of a half cycle per second.

According to the specific embodiment of the invention to be described, a source of low frequency waves, say 200 cycles, is transmitted as a modulation of one of the high frequency waves and is demodulated by the other high frequency wave which it is desired to have of the same frequency as the first. Any difference in frequency between the high frequency waves appears as an error in the demodulated low frequency wave, and this error affects a 200-cycle-responsive circuit to cause a correction to be made in one of the high frequency sources.

The system shown in Fig. 1 is represented as comprising two terminal stations interconnected by the multiplex line ML. Low frequency lines $L_1$ and $L_2$, which may be telephone lines or other types of signaling lines, are arranged for simultaneous and independent communication over the line ML with corresponding similar lines $L_3$ and $L_4$ at the right of the figure. Each low frequency line is provided with a balancing artificial line or network N and with a differential repeating coil H, commonly known as a hybrid coil, for enabling independent transmission in the two directions between the line and the high frequency terminal apparatus.

Carrier currents are utilized for transmission over the line ML and are grouped as to their frequencies, the higher frequencies, as a group, being used for transmission to the right in the figure and the lower frequencies, as a group, being used for transmission to the left. High pass filters $HP_1$ and $HP_2$ at the respective terminals are each paired with a low pass filter $LP_1$ and $LP_2$. These filters serve to separate the directional groups of carrier waves to the respective terminal transmitting and receiving circuits. These filters and each of the other filters shown throughout the system may be constructed and designed in accordance with the principles laid down in the United States patent to Campbell No. 1,227,113, issued May 22, 1917.

For purposes of the present description, a low pass filter may be taken to be any filter which transmits freely currents of all frequencies between zero and a preassigned limiting frequency and suppresses transmission of currents of all frequencies higher than said limiting frequency. Conversely high pass filter may be taken as referring to any filter which freely transmits currents of all frequencies higher than a preassigned limiting frequency and suppresses currents of all frequencies lower than said limiting frequency. Specific types of both of these kinds of filters are shown, for example in Fig. 11 of the Campbell patent referred to.

In the system shown all of the carrier frequencies used at either terminal station are derived from a common base frequency source $BS_1$ or $BS_2$ at the respective station. The base frequency wave is amplified at A and impressed on the harmonic generator $HG_1$ or $HG_2$ from which a number of waves of harmonic frequencies of the base frequency are produced. These base frequency wave sources may be of the type disclosed in the United States patent to Hartley No. 1,356,763, issued October 26, 1920, or they may be of any other suitable type. The amplifier A is preferably a vacuum tube amplifier of the audion type. The harmonic generator $HG_1$ or $HG_2$ may be of the type disclosed in the British Patent No. 142,571. The harmonic waves thus produced are conducted over the harmonic supply circuit $HS_1$ or $HS_2$ respectively to the high frequency signaling sets of the various channels.

The carrier system illustrated is of the type in which the carrier wave of each channel is suppressed from transmission when no signals are being sent, and when signals are being transmitted the modulation components of the modulated wave are sent over the line, but no unmodulated components of the carrier wave are transmitted. In order to reproduce the signal from modulated waves of this character, it is desirable to supply at the receiver a wave of the same frequency as the carrier wave which was suppressed at the transmitter. A more complete description of systems of this general character will be found in British Patents Nos. 102,503 and 131,426, and in an article entitled "Carrier current telephony and telegraphy" by Messrs. Colpitts and Blackwell, published in the Proceedings of the American Institute of Electrical Engineers for April, 1921.

In order to supply high frequency waves for both transmitting and receiving purposes at each terminal, the supply circuits $HS_1$ and $HS_2$ are connected to the modulating and detecting devices of each channel through filters arranged to select a particular harmonic frequency utilized for transmitting or for receiving by that channel. For example, circuit $HS_1$ is connected to the modulator $M_1$ through the filter $6F_1$ and to the detector $D_1$ through the filter $4F_1$. The filter $6F_1$ may conveniently select the sixth harmonic of the base frequency wave, the filter $4F_1$ may select the fourth harmonic, and so on. In a similar manner the modulator $M_2$ employs the fifth harmonic, and the detector $D_2$ the third harmonic, respectively derived from the circuit $HS_1$ through the filters $5F_1$ and $3F_1$. As indicated above these modulators are of the type which produce modulated high frequency waves but suppress the unmodulated high frequency carrier-wave component. Modulator and demodulator or detector circuits suitable for use in this system are disclosed in the United States patent to Carson No. 1,343,306, issued June 15, 1920.

The modulated waves from the modulators $M_1$ and $M_2$ are transmitted through respective filters $6F_2$ and $5F_2$ arranged to transmit one or both side bands, preferably one side band, of the corresponding modulated high frequency wave. For a fuller exposition of "side-band" as here used, page 309 of the Colpitts and Blackwell publication above cited may be referred to. Filters $4F_2$ and $3F_2$ selectively transmit from the receiving branch to the respective detectors $D_1$ and $D_2$ waves utilized by these channels for receiving. A similar arrangement of modulators, detectors and filters is to be found at the opposite terminal except that here it will be noted that the modulators utilize frequencies in the lower directional group and the detectors use frequencies in the higher directional group.

The circuit $HS_1$ in addition to supplying harmonics to the various channels is shown arranged for supplying a harmonic higher than those used for signaling, through the filter $7F_1$ to the modulator CM which serves as a control modulator for effecting modulation of this harmonic wave in accordance with the wave from the control source CS. This control wave may have a relatively low frequency for example, 200 cycles. The resulting modulated wave is transmitted through the filter $7F_2$ which is arranged preferably to transmit only the upper side frequency component resulting from the modulation of the harmonic wave by the low frequency control wave. At the opposite terminal a selective receiving channel for this high-frequency wave modulator by the low-frequency control wave is provided comprising the receiving filter $7F_4$, detector $D_5$ and associated elements, the operation of which will be made clear hereinafter. The modulator CM, the detector $D_5$ and the filters $7F$ to $7F_4$ may be standard signal-channel apparatus and the invention may therefore be readily applied to an existing system by setting aside one channel for control purposes and simply adding the necessary low frequency terminal control apparatus.

The operation of the system is as follows: Assuming that the lines $L_1$ to $L_4$ are telephone lines, the voice waves received over the line $L_1$ for example, are transmitted to the input side of the modulator $M_1$ through the filter LF which is arranged to pass selectively currents of the relatively low frequencies comprised in the speech range. These speech waves modulate the high frequency wave received by the modulator $M_1$ through the filter $6F_1$. The unmodulated high frequency component is suppressed by the modulator itself and the filter $6F_2$ selectively transmits either one or both of the resulting side bands, preferably only the upper side band, to the outgoing filter $HP_1$. Currents so modulated traverse the multiplex line ML, are selectively passed by the filters $HP_2$ and $6F_4$ and are impressed upon the detector or demodulator $D_3$. A wave of harmonic frequency supposedly identical with the frequency of the wave impressed on the modulator $M_1$ is derived from the circuit $HS_2$ and impressed on the detector $D_3$ by the filter $6F_3$. A wave of this frequency when combined in the detector circuit with the received modulated components reproduces the speech waves, which pass through the filter LF into the line $L_3$. This combining action is explained in British Patent No. 131,426. Speech waves received from the line $L_3$ modulate at $M_3$ the wave of the harmonic frequency selectively transmitted through the filter $4F_3$ and both side bands or, preferably, only the lower side band, transmitted through the filters $4F_4$ and $LP_2$ to the multiplex line. These modulated currents are selectively transmitted by the filters $LP_1$ and $4F_2$ to the detector $D_1$ where they are combined with an unmodulated wave received through the filter $4F_1$ and reproduce voice frequency currents to be impressed on the line $L_1$. Communication between the lines $L_2$ and $L_4$ is carried on in an entirely similar manner by the use of other harmonic frequencies and it will be obvious, how still other communication channels can be arranged for as may be desired by mere duplication of the apparatus that has been illustrated.

It is assumed in the above description that the wave introduced from the harmonic supply circuit of one station to the detector of any channel is identical in frequency with the wave introduced at the other station into the modulator of the same channel. This can only be true if the base frequency sources $BS_1$ and $BS_2$ generate waves of the same frequency.

In the system of the British Patent No. 131,426 above noted, a single base frequency source is provided for the system and this wave is transmitted over the line and is used at the distant station to produce harmonic frequencies identical with the harmonic frequencies used at the first station. This base frequency wave, however, has a frequency lower than any of the waves used as carriers and it is not always convenient to transmit for carrier telephone purposes a wave of the frequency of the base frequency wave. For example, in composite carrier telephone and carrier telegraph systems the carrier telegraph channels can conveniently make use of a lower range which would include the base frequency wave for the carrier telephone channels. There may be other reasons why it would not be desirable to make the carrier telephone transmissions depend upon the transmission through the same system of a relatively low base frequency wave.

According to the present invention the two sources of base frequency current, $BS_1$ and $BS_2$, although independent wave generators, are controlled by means of a high frequency which is preferably higher than any of the frequencies used by the carrier telephone channels. For this purpose the low frequency control source CS is arranged to modulate in the modulator CM the wave selected by the filter $7F_1$. The resulting upper side band is transmitted through the filters $7F_2$ and $HP_1$ to the line. This modulated wave is received through the filters, $HP_2$ and $7F_4$ from which it is impressed on the detector $D_5$ also supplied with a corresponding harmonic frequency from the circuit $HS_2$ through the filter $7F_3$. If the sources $BS_2$ and $BS_1$ are of exactly the same frequency, the corresponding harmonics transmitted through the respective filters $7F_1$ (to the modulator CM) and $7F_3$ (to the detector $D_5$) are identical in frequency and as a result the low frequency output of component of the detector $D_5$ will have the same frequency as the source CS.

The low pass filter LPF is so adjusted that it transmits current of the low frequency generated by the source CS with a mean amplitude as indicated by the line $a-a$ of the curve in Fig. 2. This curve shows the relation between the current amplitude I and the frequency F of current transmitted by the filter LPF. At frequencies lower than that indicated by the line $a-a$ the transmitted current is greater, and for frequencies higher than that indicated by the line $a-a$, the transmitted current is smaller than for the frequency indicated at $a-a$. Such an arrangement between the detector $D_5$ and the rectifier R, acts as a variable cutoff, permitting more current to reach the rectifier as the frequency received from the detector $D_5$ becomes lower and permitting less current to pass as the frequency becomes higher.

The output circuit of the rectifier R which may be any known type of rectifier such as the well-known two electrode vacuum tube type is connected to the coil of a current meter MM, the needle of which carries the movable plate of the adjustable condenser $C_1$. This variable condenser is connected in parallel with the tuning condenser $C_2$ of the oscillator $BS_2$. The fluctuations of the needle of the meter MM vary the capacity of condenser $C_1$ and thereby the total capacity of the frequency-determining circuit of the oscillator $BS_2$, causing a variation in the frequency of the generated wave.

Since the wave transmitted through the control channel is the upper side frequency of the control-modulated wave, if the two base sources are in synchronism, the frequency transmitted from the filter $7F_3$ will be lower than the frequency received through the filter $7F_4$ by the frequency of the wave generated by source CS. If the frequency of the source $BS_2$ decreases by a slight amount from synchronous frequency the frequency transmitted from the filter $7F_3$ also decreases a corresponding amount, this filter having sufficient range to take care of fluctuations in frequency that may reasonably be expected in practice. Assuming that the frequencies of the source $BS_1$ and CS remain unchanged at this time it is evident that the wave resulting from the action of detector $D_5$ will have a higher frequency than if the base frequency sources were in exact synchronism. This will, according to the relations shown in Fig. 2, cause a smaller than normal current to pass through the filter LPF to the rectifier R and the needle of the galvanometer or meter MM will shift in such a way as to decrease the capacity of the condenser $C_1$. This change in the capacity of the condenser $C_1$ will decrease the total capacity of the oscillator and increase the frequency of the generated wave and therefore of the wave passing through the filter $7F_3$, tending to restore the synchronous condition between the base frequency sources. Similarly an increase in the frequency of the source $BS_2$ from its normal value will result in a lower than normal frequency in the output of detector $D_5$ which will permit a larger than normal current to pass through the filter LPF to the rectifier R and the actuation of the condenser $C_1$ in the opposite direction so that the frequency of the oscillator $BS_2$ is again diminished.

It is not required that it be an upper side band which is transmitted by the filters $7F_2$ and $7F_4$ since the lower side band can be used if desired with a corresponding change in the relation of the correcting circuits.

It is seen from the above description that the discrepancy between the frequencies selected by the filters $7F_1$ and $7F_3$ at the respective terminals of the system is made to appear numerically as a deviation in the low frequency in the output of detector $D_5$ from its normal value. If this normal value of the low frequency from the source CS is made quite low, say 200 cycles for example, a relatively small change in the frequency of the control channel will appear as a relatively large change in the frequency of this low frequency wave and the correcting mechanism is therefore much more sensitive than as though it were arranged to respond merely to percentage differences in the high frequency control channel wave.

It is to be understood that the invention is not to be limited to the details of the particular transmission system in which it has been described as embodied, since it is also applicable to other systems. Also the precise manner of utilizing the low frequency control wave to effect correction can be varied widely, and the invention is to be limited only by the scope of the appended claims.

What is claimed is:

1. In a system of transmission by high frequency waves, the method of coordinating separate wave sources in separate stations comprising modulating a wave derived from a source at a sending station by a relatively low frequency wave, transmitting the wave so modulated to a distant receiving station, demodulating the received wave by combining it with a wave derived from a source at the receiving station to produce a low frequency wave having a normal frequency when said sources are in exact synchronism and a frequency different from normal when said sources are out of synchronism, and controlling the frequency of the wave generated at said receiving station in accordance with deviations of the demodulated low frequency wave from its normal frequency.

2. In a system of transmission by high frequency waves, the method of coordinating separate wave sources in separate stations, comprising modulating a wave derived from a source at a sending station by a relatively low frequency wave, suppressing the unmodulated component of the high frequency wave and transmitting a side frequency component resulting from such modulation to a distant receiving station, demodulating the received wave by combining it with a wave derived from a source at the receiving station to produce a low frequency wave having a normal frequency when said sources are in exact synchronism and a frequency different from normal when said sources are out of synchronism, and controlling the frequency of the waves generated at said receiving station in accordance with deviations of the demodulated low frequency wave from its normal frequency in such a manner and to such an extent as to maintain said sources substantially in synchronism with each other.

3. In a high frequency transmission system, stations, high frequency wave sources at respective stations, a source of relatively low frequency waves at one station, means at said one station for modulating said wave of high frequency in accordance with the low frequency waves from said source, means to transmit the waves so modulated to a distant station, means at said distant station for combining said modulated wave with a high frequency wave derived from the source at that station to produce a resultant low frequency wave, having a normal frequency when said high frequency sources are in exact synchronism, and means to control the frequency of the wave generated by said source at said distant station in accordance with deviations of the frequency of said resultant low frequency from a normal frequency.

4. In a high frequency transmission system, stations, sources of high frequency waves of nominally the same frequency at respective stations, a source of relatively low frequency waves at a sending station, a circuit at a receiving station responsive to a wave of said low frequency and sensitive to small deviations from said low frequency, means to transmit the low frequency wave from said source at said sending station in the form of variations in the high frequency wave from the source at that station, means at said receiving station to derive from the wave so transmitted a low frequency wave having a frequency equal to the difference between the transmitted wave and the wave from the high frequency source at said receiving station and to impress the derived wave on said circuit and means to alter the frequency of the wave generated at said receiving station in accordance with the response of said circuit to said derived wave.

5. In a high frequency transmission system, transmitting and receiving stations, sources of high frequency waves at the respective stations, a source of relatively low frequency waves at one station, means to transmit said low frequency waves in the form of variations of a high frequency wave from that station, a control circuit at the other station sensitive to a wave of said low frequency and differently responsive to deviations from said low frequency, means to derive from the transmitted frequency and to impress on said control circuit a wave differing from the frequency of said low frequency wave by the difference between the high frequency waves generated in said transmitting and receiving stations and frequency correcting means for the high frequency source at said receiving station controlled by said control circuit.

6. In a high frequency transmission system, stations, means to modulate a high frequency wave by a low frequency component and to transmit between said stations a component resulting from such modulation, independent generating means at a station for generating a high frequency wave of nominally the same frequency as the high frequency wave so modulated, means to cause said high frequency waves to interact to produce a low frequency wave differing from the low frequency modulating component of said high frequency wave by substantially the difference between said high frequency wave so modulated and the locally generated high frequency wave, and means responsive to a wave of the difference frequency between the low frequency modulating component and the low frequency wave for controlling the frequency of the locally generated high frequency wave.

7. In a high frequency transmission system, stations, high frequency wave sources at the respective stations, a relatively low frequency wave source at one station, a modulator for modulating one of said waves by said low frequency wave and for transmitting a side frequency of the modulated wave while suppressing transmission of the high frequency unmodulated component, a detector at another station for combining the received side frequency wave with the high frequency wave generated at that station to produce a low frequency wave of a frequency equal to the difference between that of the received side frequency wave and that of the locally generated high frequency wave, a circuit associated with said detector and sensitive to frequency differences between the low frequency wave so produced and the low frequency wave used to modulate the high frequency wave at the first station, and means controlled by said circuit for changing the frequency of the locally generated wave.

8. An arrangement as claimed in claim 7, said circuit associated with said detector comprising a low pass filter connected to the output of said detector, a rectifier connected to said filter and a current responsive device connected to said rectifier, said filter being so arranged that the detected low frequencies fall within the gradual cutoff range of said filter.

9. An arrangement as claimed in claim 7, said circuit associated with said detector comprising a low pass filter connected to the output of said detector, a rectifier connected to said filter and a current responsive device connected to said rectifier, said filter being so arranged that the detected low frequencies fall within the gradual cut-off range of said filter, said means for controlling the frequency of the locally generated wave comprising a variable condenser actuated by said current responsive device.

10. In a multiplex carrier current system, a line terminating in stations, high frequency channels superposed on said line, said channels including modulators arranged to transmit the side frequency components of high frequency waves modulated by low frequency waves while suppressing the unmodulated high frequency components from transmission, a source of sustained low frequency waves associated with one of said modulators, detectors at the distant station for combining the received modulated waves with locally generated waves to reproduce the low frequency modulating waves, a common source for said locally generated waves, one of said detectors serving to reproduce said sustained low frequency wave, a circuit associated with said one detector, sensitive to variations in the frequency of the reproduced low frequency sustained wave, said circuit being arranged to control the generating frequency of said common source in such direction and to such an extent as substantially to hold the locally generated waves in synchronism with the unmodulated components of the transmitted waves.

11. In a multiplex carrier wave system, a transmitting station, a receiving station, means at the transmitting station to produce and modulate a plurality of high frequency waves, means to transmit said modulated waves and a wave of a frequency higher than any of said modulated waves, means to derive from said transmitted wave of the highest frequency a low frequency wave, and means controlled by the derived low frequency wave for furnishing waves at the receiving station of the same frequency as those modulated at the transmitting station.

12. In a multiplex signaling system, terminal stations, a source of waves at each station, means to derive from each of said sources waves of a number of definite frequencies for use in signal transmission between said stations, means to transmit between said stations a modulated wave of a frequency higher than any of such derived waves, means for demodulating said last mentioned wave at the receiving station to produce a low frequency wave, means at the receiving station for generating a similar low frequency wave, and means responsive to the difference in frequency of said low frequency waves for maintaining said sources in synchronism with each other.

13. In a multiplex signaling system, stations, sources of waves of nominally the same frequency at respective stations, means responsive to a wave of lower frequency than said sources for maintaining definite frequency relation between the sources at respective stations, means to transmit a wave of said lower frequency between stations in the form of a modulation of a wave of higher frequency than said sources, and means at the receiving station to derive said low frequency wave from the received high frequency modulated wave.

14. In combination, two separated stations, a source of base frequency waves at each station, means at each station for generating harmonics of said base, means for carrying on a plurality of simultaneous two-way communications between said stations including means at each station for modulating each of a plurality of harmonics of the locally generated base frequency wave by an individual outgoing message, means for transmitting said modulated waves to the other station, means at each station for combining with the incoming modulated waves a corresponding frequency harmonic of the locally generated base frequency wave, and means responsive to any difference in frequency between corresponding frequency harmonics of said two base frequency waves for changing the frequency of one of said base frequency waves to make it the same as the other base frequency.

In witness whereof, I hereunto subscribe my name this 17th day of April A. D., 1922.

JOSEPH W. HORTON.